US012223267B2

(12) United States Patent
Matsuzawa et al.

(10) Patent No.: US 12,223,267 B2
(45) Date of Patent: Feb. 11, 2025

(54) QUESTION ANSWERING SYSTEM, QUESTION ANSWERING PROGRAM, AND QUESTION ANSWERING METHOD

(71) Applicant: Hitachi, Ltd., Tokyo (JP)

(72) Inventors: Keiichi Matsuzawa, Tokyo (JP); Mitsuo Hayasaka, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 408 days.

(21) Appl. No.: 17/691,616

(22) Filed: Mar. 10, 2022

(65) Prior Publication Data

US 2022/0391586 A1 Dec. 8, 2022

(30) Foreign Application Priority Data

Jun. 3, 2021 (JP) .................................. 2021-093934

(51) Int. Cl.
*G06F 40/279* (2020.01)
*G06F 40/166* (2020.01)

(52) U.S. Cl.
CPC .......... *G06F 40/279* (2020.01); *G06F 40/166* (2020.01)

(58) Field of Classification Search
CPC ... G06F 40/279; G06F 40/166; G06F 16/3329
USPC ............................................................ 704/9
See application file for complete search history.

(56) References Cited

U.S. PATENT DOCUMENTS 8,560,567 B2  10/2013  Azzam et al.

FOREIGN PATENT DOCUMENTS

JP        2004171479 A  *  6/2004
WO    2020/100553 A1      5/2020

\* cited by examiner

*Primary Examiner* — Thierry L Pham
(74) *Attorney, Agent, or Firm* — Volpe Koenig

(57) ABSTRACT

A question answering system includes a dangerous operation determination unit configured to determine whether question-answer pair data includes a dangerous operation, and an answer sentence replacement unit configured to replace, when it is determined that the dangerous operation is included, an answer sentence including a description of the dangerous operation included in a document by a replaced answer sentence depending on a classification of the dangerous operation, to thereby create replaced question-answer pair data.

14 Claims, 16 Drawing Sheets

| QUESTION SENTENCE 310 | ANSWER SENTENCE 320 | |
|---|---|---|
| HOW DO I RECOVER DATA? | DATA IS RECOVERED BY FOLLOWING PROCEDURES.<br>1. MAKE FILE READ ONLY<br>2. EXECUTE recover COMMAND | 331 |
| HOW DO I FIX DISK ERROR? | DISK ERROR IS FIXED BY FOLLOWING PROCEDURES.<br>1. DELETE VOLUME<br>2. CHANGE DISK | 332 |
| WHAT PC SPECIFICATIONS ARE REQUIRED? | CPU FREQUENCY OF 2 GHz OR MORE AND MEMORY CAPACITY OF 1 GB OR MORE | 333 |

FIG. 6

| EXTRACTION PATTERN | [SECTION] <PROCESS><br>[SECTION BODY] <PROCEDURE> |
|---|---|
| ANSWER DATA TEMPLATE | QUESTION: WHAT IS <PROCESS>? |
| | ANSWER: <PROCEDURE> |

| EXTRACTION PATTERN | [DATA ROW]<br>　　[TITLE] <ITEM><br>　　[CELL] <DESCRIPTION> |
|---|---|
| ANSWER DATA TEMPLATE | QUESTION: WHAT IS <ITEM>? |
| | ANSWER: <ITEM> IS <DESCRIPTION>. |

| EXTRACTION PATTERN | <PHRASE> MEANS <MEANING>. |
|---|---|
| ANSWER DATA TEMPLATE | QUESTION: WHAT DOES <PHRASE> MEAN? |
| | ANSWER: <PHRASE> MEANS <MEANING>. |

FIG. 8

| EXPECTED USER | QUESTION SENTENCE | ANSWER SENTENCE | |
|---|---|---|---|
| PRODUCT VENDOR MAINTENANCE PERSONNEL | HOW DO I RECOVER DATA? | DATA RECOVERY IS PROCESS OF RESTORING DELETED DATA. DATA IS RECOVERED BY FOLLOWING PROCEDURES.<br>(1) MAKE FILE READ ONLY<br>(2) EXECUTE recover COMMAND | 831 |
| USER ADMINISTRATOR | HOW DO I FIX DISK ERROR? | PLEASE FIX DISK ERROR BY FOLLOWING PROCEDURES<br>(1) DELETE VOLUME<br>(2) CHANGE DISK | 832 |
| END USER | WHAT PC SPECIFICATIONS ARE REQUIRED? | REQUIRED PC SPECIFICATIONS ARE AS DESCRIBED IN FOLLOWING TABLE.<br><br>| ITEM | SPECIFICATION |<br>\|---\|---\|<br>\| REQUIRED CPU FREQUENCY \| 2 GHz OR MORE \|<br>\| REQUIRED MEMORY CAPACITY \| 1 GB OR MORE \| | 833 |
| END USER | WHAT CPU FREQUENCY IS REQUIRED? | 2 GHz OR MORE | 834 |
| END USER | WHAT MEMORY CAPACITY IS REQUIRED? | 1 GB OR MORE | 835 |
| END USER | WHAT IS DATA RECOVERY? | DATA RECOVERY IS PROCESS OF RESTORING DELETED DATA. | 836 |

FIG.10

| CLASSIFICATION | EXPRESSION | REPLACEMENT METHOD | |
|---|---|---|---|
| DATA LOST | ·DELETE DATA<br>·DELETE VOLUME<br>·deletedata COMMAND | SENTENCE IS REPLACED BY MESSAGE TO SUPPORT DEPARTMENT | 1051 |
| DATA MANIPULATION | ·MAKE FILE READ ONLY<br>·MOVE DATA<br>·movedata COMMAND | WARNING MESSAGE IS ADDED TO BEGINNING | 1052 |
| SERVICE OUTAGE | ·TURN OFF POWER<br>·UNPLUG CABLE<br>·poweroff COMMAND<br>·power BUTTON | ANSWERS ARE NOT EMPLOYED | 1053 |

FIG.11

| QUESTION SENTENCE | DANGEROUS OPERATION | REPLACED ANSWER SENTENCE | |
|---|---|---|---|
| HOW DO I RECOVER DATA? | DATA MANIPULATION | PLEASE BE AWARE THAT FOLLOWING OPERATION MAKES CHANGE TO DATA.<br><br>DATA RECOVERY IS PROCESS OF RESTORING DELETED DATA. DATA IS RECOVERED BY FOLLOWING PROCEDURES.<br>(1) MAKE FILE READ ONLY<br>(2) EXECUTE recover COMMAND | 1131 |
| HOW DO I FIX DISK ERROR? | DATA LOST | WHEN DISK ERROR OCCURS, PLEASE CONTACT SUPPORT DEPARTMENT. | 1132 |
| WHAT PC SPECIFICATIONS ARE REQUIRED? | N/A | REQUIRED PC SPECIFICATIONS ARE AS DESCRIBED IN FOLLOWING TABLE.<br><br>\| ITEM \| SPECIFICATION \|<br>\|---\|---\|<br>\| REQUIRED CPU FREQUENCY \| 2 GHZ OR MORE \|<br>\| REQUIRED MEMORY CAPACITY \| 1 GB OR MORE \| | 1133 |
| WHAT CPU FREQUENCY IS REQUIRED? | N/A | 2 GHz OR MORE | 1134 |
| WHAT MEMORY CAPACITY IS REQUIRED? | N/A | 1 GB OR MORE | 1135 |
| WHAT IS DATA RECOVERY? | N/A | DATA RECOVERY IS PROCESS OF RESTORING DELETED DATA. | 1136 |

FIG.12

| | | | OPERATION OBJECT | | |
|---|---|---|---|---|---|
| | | CLASSIFICATION | DATA (1221) | OPERATING REQUIREMENTS (1222) | SETTINGS (1223) |
| | CLASSIFICATION | EXAMPLE | ·VOLUME ·DISK ·FILE | ·POWER ·CABLE | ·IP ADDRESS ·HOST NAME |
| OPERATION CONTENT | DELETE | ·ERASE ·DELETE ·REMOVE | DATA LOST (1251) | SERVICE OUTAGE | SERVICE OUTAGE |
| | CHANGE | ·CHANGE ·EXCHANGE | DATA MANIPULATION | SERVICE OUTAGE | SETTING CHANGE |
| | ADD | ·ADD | DATA MANIPULATION | - | - |
| | STOP | ·STOP ·SUSPEND ·OFF | SERVICE OUTAGE | SERVICE OUTAGE | SERVICE OUTAGE |
| | REFER | ·DISPLAY ·BROWSE | PERFORMANCE DEGRADATION | - | - |

FIG.13

| OWNER | DEVICE ID | COMPONENT/ INDEX | CONDITION |
|---|---|---|---|
| Alice | ABC123 | PROCESSOR | NORMAL |
| Alice | ABC123 | DISK | ABNORMAL |
| Alice | ABC123 | POWER | NORMAL |
| Alice | ABC123 | PERFORMANCE | 100MB/s |
| Alice | DEF456 | PROCESSOR | NORMAL |
| Alice | DEF456 | DISK | NORMAL |
| Alice | DEF456 | POWER | NORMAL |
| Alice | DEF456 | PERFORMANCE | 50MB/s |
| Bob | GHI789 | PROCESSOR | NORMAL |
| Bob | GHI789 | DISK | ABNORMAL |

FIG.14

| CLASSIFICATION | CONDITION | | REPLACEMENT METHOD |
|---|---|---|---|
| | EXPECTED USER | USER ATTRIBUTE | |
| OPERATION FOR MAINTENANCE PERSONNEL | PRODUCT VENDOR MAINTENANCE PERSONNEL | ADMINISTRATOR USER OR END USER | QUESTION-ANSWER PAIR IS EXCLUDED FROM ANSWER FOR CUSTOMER |
| OPERATION FOR ADMINISTRATOR | ADMINISTRATOR USER | END USER | WARNING MESSAGE IS ADDED TO BEGINNING |

QUESTION ANSWERING SYSTEM, QUESTION ANSWERING PROGRAM, AND QUESTION ANSWERING METHOD

BACKGROUND OF THE INVENTION

1. Field of the Invention

The present invention relates to a question answering system, a question answering program, and a question answering method.

2. Description of the Related Art

By the development of artificial intelligence technologies and natural language processing technologies, the utilization of question answering systems via chatbots or the like has been expanded. Hitherto, question answering systems have often been used for making chats or simple responses but are being expandingly utilized for product customer support of companies in recent years.

The main purpose of use of question answering systems for product customer support is to correctly and quickly answer the inquiry from a customer, thereby speedily solving the problem of the customer. The fact that the problem of a customer can be speedily solved leads to a reduction in support cost and is thus advantageous for both customers and product provider companies.

In order to correctly and quickly answer the inquiry from a customer, a question answering system needs to be capable of answering as many questions as possible. Many question answering systems have expected questions and answer sentences corresponding thereto prepared in advance and provide an answer sentence corresponding to an expected question similar to the content of an inquiry. Thus, it is important to prepare many pairs of expected question and answer sentence in order to correctly and quickly answer the inquiry from a customer.

However, to prepare expected questions and answer sentences, a lot of man-hours are generally required. Thus, it is difficult to create a large number of expected questions and answer sentences by manpower. Accordingly, there have been proposed techniques for mechanically generating expected questions and answer sentences from an existing material.

For example, U.S. Pat. No. 8,560,567 B2 extracts frequently asked questions (FAQ) existing in a website or manual and converts the frequently asked questions to a format compatible with a question answering system, to thereby mechanically generate expected questions and answer sentences.

Further, WO 2020100553 A1 converts descriptions in a manual that correspond to specific patterns from the sentence or document form to expected questions and answer sentences, to thereby mechanically generate expected questions and answer sentences.

SUMMARY OF THE INVENTION

With the techniques of U.S. Pat. No. 8,560,567 B2 and WO 2020100553 A1, many expected questions and answer sentences can be generated. Meanwhile, those techniques have a risk that, since answer sentences are mechanically generated, dangerous operations that give disadvantages to customers are suggested.

For example, when an original material includes the description of a dangerous operation, for example, an operation that stops the function of a product, with the techniques described above, the operation is suggested as it is as an answer for an inquiry. Depending on the way that a customer makes an inquiry, a question answering system may provide an answer that is right for an expected question but wrong for the problem of the customer.

In this case, there is a risk that the customer trusts the answer from the question answering system and performs the operation wrong for the problem of the customer. This is contrary to the purpose of introducing question answering systems, that is, answering the inquiry from a customer correctly and quickly.

It is an object of the present invention to prevent a question answering system from suggesting dangerous operations to a questioner.

According to an aspect of the present invention, there is provided a question answering system including a question-answer pair generation processing unit configured to identify a question pattern and an answer pattern corresponding to the question pattern from a description included in a document and convert the question pattern and answer pattern identified to create question-answer pair data including a question sentence and an answer sentence, and a question-answer pair replacement processing unit configured to replace the question-answer pair data by replaced question-answer pair data including the question sentence and a replaced answer sentence. The question-answer pair replacement processing unit includes a dangerous operation determination unit configured to determine whether the question-answer pair data includes a dangerous operation, and an answer sentence replacement unit configured to replace, when it is determined that the dangerous operation is included, the answer sentence including a description of the dangerous operation included in the document by the replaced answer sentence depending on a classification of the dangerous operation, to thereby create the replaced question-answer pair data.

According to the aspect of the present invention, it is possible to prevent the question answering system from suggesting dangerous operations to a questioner.

BRIEF DESCRIPTION OF THE DRAWINGS

FIG. 3 is a diagram illustrating exemplary question-answer pair data according to Embodiment 1;

FIG. 6 is a diagram illustrating an exemplary question-answer pair generation pattern according to Embodiment 1;

FIG. 8 is a diagram illustrating exemplary question-answer pair data generated from the document according to Embodiment 1;

FIG. 10 is a diagram illustrating an exemplary dangerous operation database according to Embodiment 1;

FIG. 11 is a diagram illustrating exemplary question-answer pair data after answer sentence replacement according to Embodiment 1;

FIG. 12 is a diagram illustrating an exemplary dangerous operation determination table according to Embodiment 2;

FIG. 13 is a diagram illustrating exemplary device information according to Embodiment 4;

FIG. 14 is a diagram illustrating an exemplary dangerous operation database according to Embodiment 3;

DESCRIPTION OF THE PREFERRED EMBODIMENTS

Embodiment 1

Figure 1:
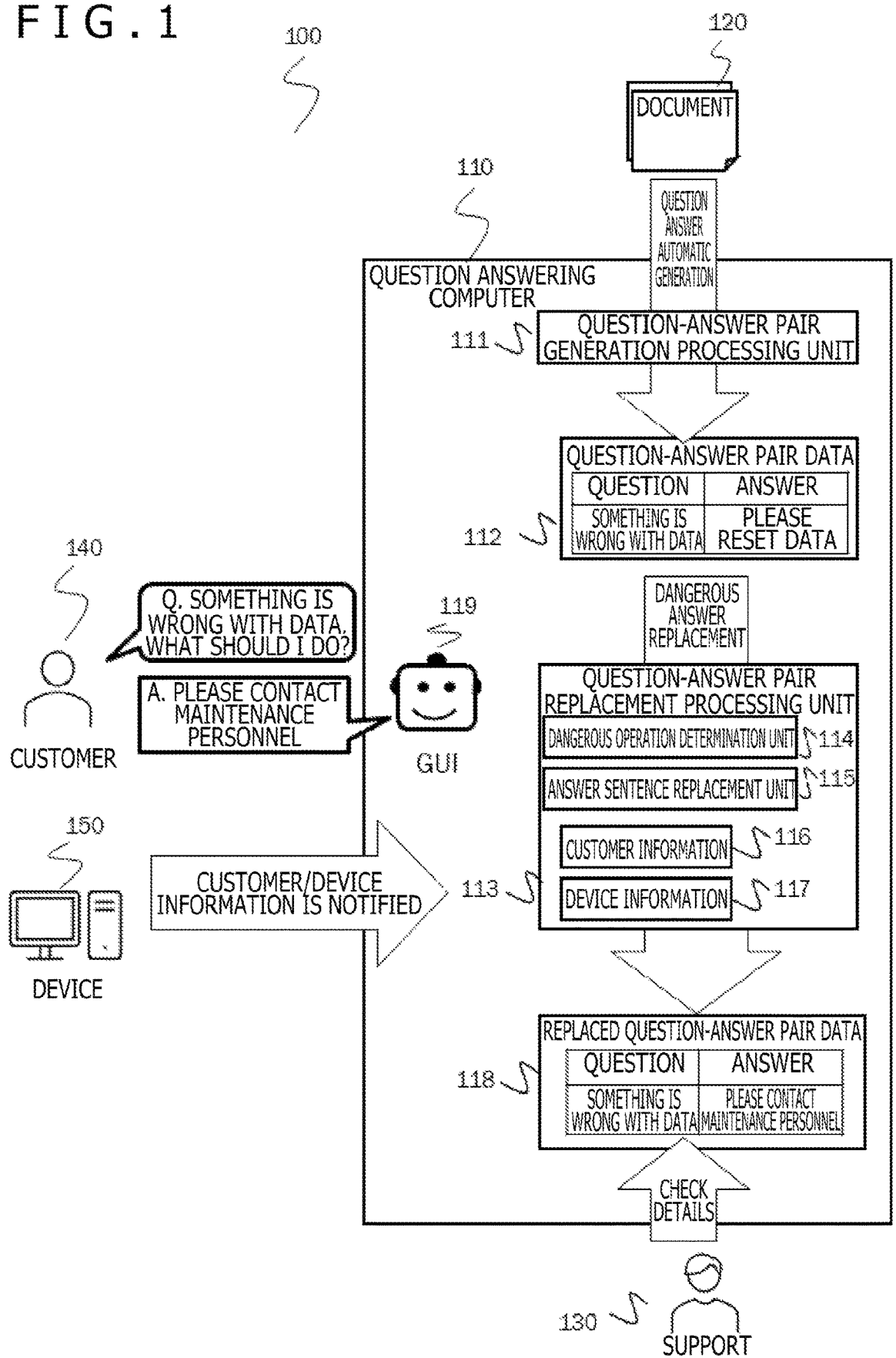
FIG. 1 is an overall view of a question answering system according to Embodiment 1.

FIG. 1 is an overall view of a question answering system 100 according to Embodiment 1.

In the question answering system, when a device 150 that a customer 140 owns has a problem, for example, and the customer wants to make an inquiry to a developer of the device, the customer 140 makes question-answer communications with a graphical user interface (GUI) 119 provided by a question answering computer 110.

The question answering computer 110 answers the question from the customer 140 by using replaced question-answer pair data 118. The replaced question-answer pair data 118 is created as follows. First, a question-answer pair generation processing unit 111 extracts an expected question-answer pair from an existing document 120 and shapes the expected question-answer pair to create question-answer pair data 112. A question-answer pair replacement processing unit 113 performs answer sentence replacement of the question-answer pair data 112. First, a dangerous operation determination unit 114 determines, using customer information 116 and device information 117, whether the question-answer pair includes an answer corresponding to a dangerous operation. When it is determined that the question-answer pair corresponds to a dangerous operation, an answer sentence replacement unit 115 on a subsequent stage replaces the answer sentence by a safe sentence. The replaced question-answer pair data 118 is created in this way.

The customer 140 and the device 150 may constantly notify the question answering computer 110 of their statuses. In such a case, when the customer information 116 or the device information 117 is updated, the result of dangerous operation determination is changed.

Now, the individual elements of the question answering system and the processing flows are described in detail.

Figure 2:
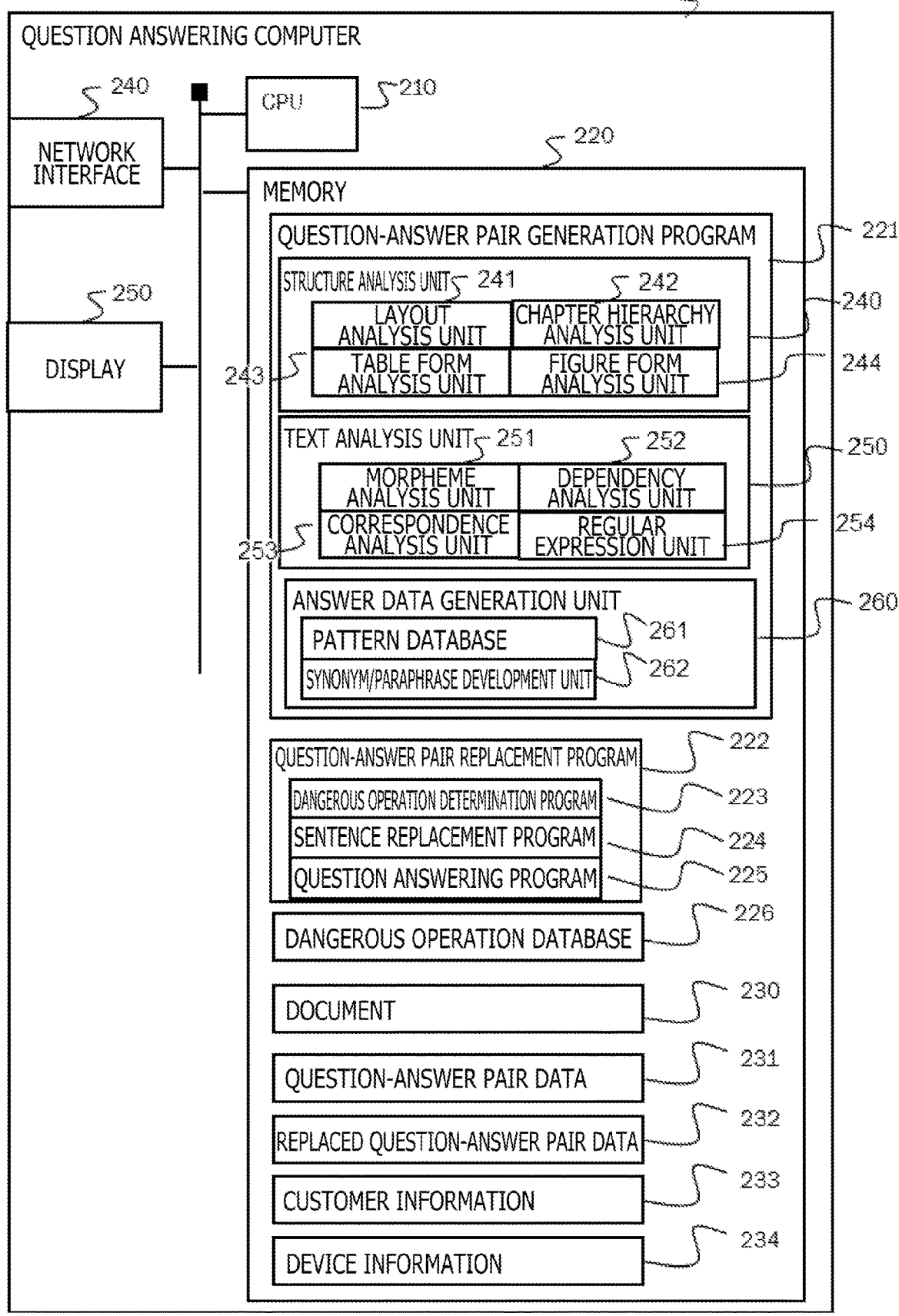
FIG. 2 is a configuration diagram of a question answering computer according to Embodiment 1.

FIG. 2 is a configuration diagram of a question answering computer 200.

The question answering computer 200 includes a central processing unit (CPU) 210, a memory 220, a network interface 240, and a display 250. The CPU 210 determines the operation of the question answering computer 200 in accordance with various programs stored in the memory 220. The memory 220 stores therein a question-answer pair generation program 221, a question-answer pair replacement program 222, a dangerous operation determination program 223, a sentence replacement program 224, a question answering program 225, a document 230, question-answer pair data 231, replaced question-answer pair data 232, customer information 233, and device information 234.

The question-answer pair generation program 221 refers to the document 230 to create the question-answer pair data 231. As the functions of the question-answer pair generation program 221, a structure analysis unit 240, a text analysis unit 250, and an answer data generation unit 260 are provided. The structure analysis unit 240 includes a layout analysis unit 241, a chapter hierarchy analysis unit 242, a table form analysis unit 243, a figure form analysis unit 244, and the like. In addition to those, the structure analysis unit 240 can have a program for analyzing the structure of a document.

The text analysis unit 250 includes a morpheme analysis unit 251, a dependency analysis unit 252, a correspondence analysis unit 253, a regular expression unit 254, and the like. In addition to those, the text analysis unit 250 can include processing units necessary for analyzing various natural languages. As the processing, for example, stemming in English and word decomposition in Chinese are given. In addition, other than those, the text analysis unit 250 can have another program for analyzing text information. The answer data generation unit 260 includes a pattern database 261 and a synonym/paraphrase development unit 262.

The question-answer pair replacement program 222 refers to the question-answer pair data 231 to create the replaced question-answer pair data 232 through the processing by the dangerous operation determination program 223 and the sentence replacement program 224. The question answering program 225 is a program for making question-answer communications with the customer 140, by using the replaced question-answer pair data 232.

The document 230 is data that is used for generating the question-answer pair data 231. The document 230 corresponds to a document, paper, or medium containing sentences, drawings, or data. For example, the document 230 corresponds to a product manual, a catalog, a FAQ list, a website, a user forum, a past inquiry database, or a product information database. The question-answer pair data 231 and the replaced question-answer pair data 232 are data in which expected questions and answer sentences for the questions that are used in the question answering system are listed. The replaced question-answer pair data 232 is equivalent to the question-answer pair data 231 except for having data contents partially changed by the question-answer pair replacement program 222. The customer information 233 is information on the customer 140 who makes an inquiry. The device information 234 is information on the device 150 that the customer 140 has. The customer information 233 and the device information 234 are not essential in the present embodiment.

The network interface 240 is used for communications with another computer. In communications, a protocol such as Transmission Control Protocol/Internet Protocol (TCP/IP) or HyperText Transfer Protocol (HTTP) or Secure Shell (SSH) configured on TCP/IP can be used. The display 250 is a device configured to display a screen for making question-answer communications with the customer 140. When there is another device configured to support question-answer communications, the device may be substituted for the display 250.

For example, when question-answer communications are made with voice, a microphone and a speaker can be substituted for the display 250. Further, the question answering computer 200 itself may not include the display 250. In this case, the question answering computer 200 may transmit, via the network interface 240, information indicating contents for screen display such as HyperText Markup Language (HTML) and make question-answer communications on a display of a computer of the customer who has received the information.

The programs 221, 222, 223, 224, and 225 and the data 230, 231, 232, and 233 that the question answering computer 200 has may be held by not a single computer but a plurality of computers in a distributed manner. For example, the question-answer pair generation program 221, the question-answer pair replacement program 222, and the question answering program 225 may operate on different computers. In this case, the question-answer pair data 231 generated by the computer having the question-answer pair generation program 221 is transmitted to the memory 220 in the computer having the question-answer pair replacement program 222 via the network interface 240, and in a similar manner, the replaced question-answer pair data 232 generated from the question-answer pair data 231 received by the computer having the question-answer pair replacement program 222 is transmitted to the memory 220 in the computer having the question answering program 225 via the network interface 240, so that the computer having the question answering program 225 can make question-answer communications using the received replaced question-answer pair data 232.

FIG. 3 illustrates a configuration example of question-answer pair data 300 that is used by the question answering program 225 for question answering.

The example of FIG. 3 illustrates a question-answer pair assuming a storage device including a disk and configured to store data. Thus, question sentences and answer sentences related to the stored data and the included disk are listed. The question-answer pair data 300 is a table in which the correspondence relations between a question sentence 310 and an answer sentence 320 are listed and a corresponding entry is stored in each row. For example, in the question-answer pair data 300 illustrated in FIG. 3, three pairs of question sentence and answer sentence are registered as entries 331, 332, and 333.

When receiving a question sentence input by the customer, the question answering program 225 searches the entries 331, 332, and 333 of the question-answer pair data 300 for a question sentence similar to the question sentence input by the customer. When there is an entry including a similar question sentence, the answer sentence 320 of the entry is output as the answer from the question answering program 225.

In determining how similar question sentences are, various natural language processing technologies that are used for language processing can be utilized. For example, a calculation method for the frequency of appearance of the same word in the sentences, a calculation method for a bilingual evaluation understudy (BLEU) value, or a calculation method for a vector distance using word embedding is applicable.

Figure 4:
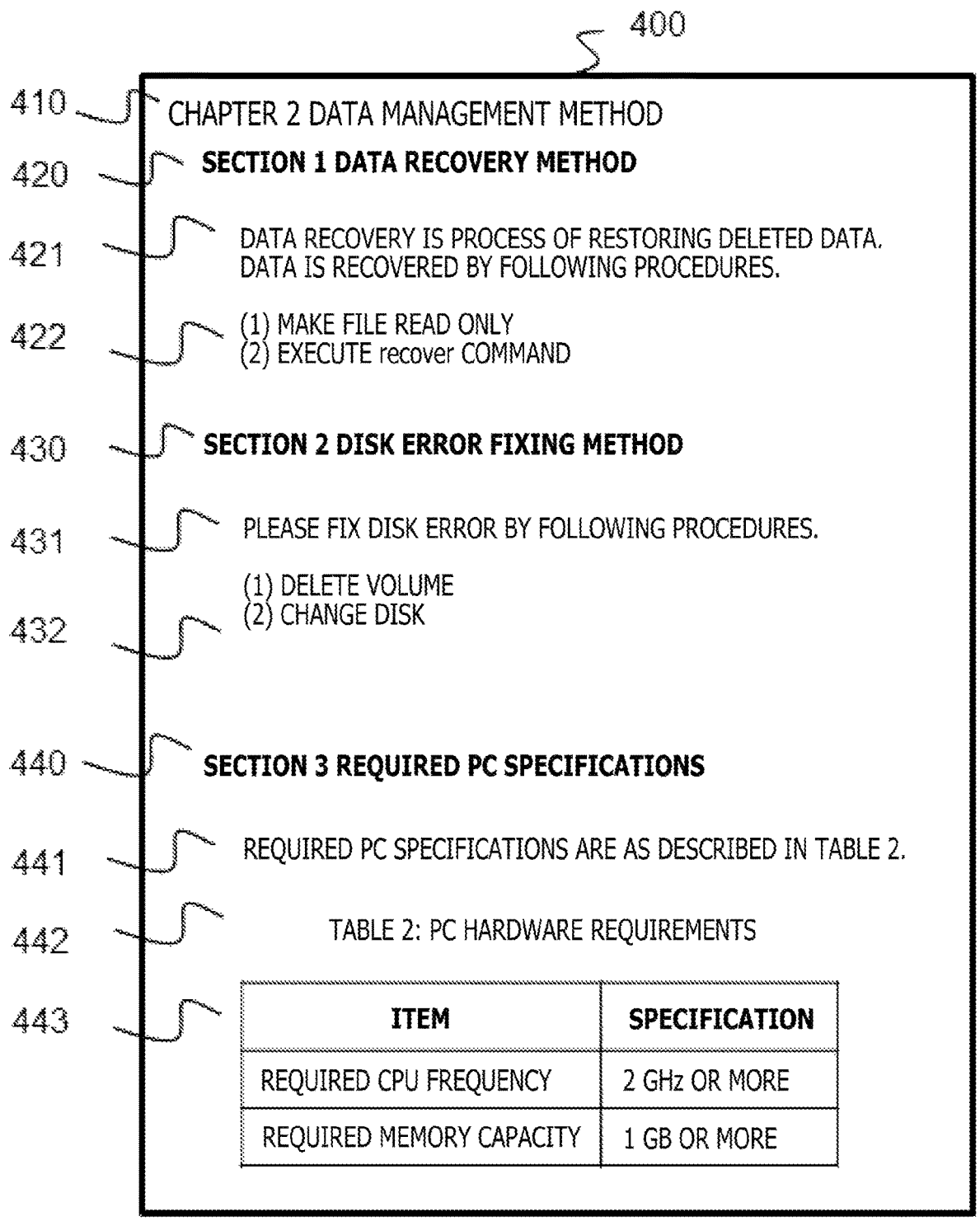
FIG. 4 is a diagram illustrating an exemplary document according to Embodiment 1.

FIG. 4 illustrates a configuration example of a document 400.

The document 400 is a document having a hierarchy and corresponds to patent literature, a treatise, a manual, a report, or the like.

The document 400 has a structure in which pieces of data on text, figures, tables, or the like are arranged in a hierarchy or layout. The structure is defined by the position, contents, size, and decoration of text or the segmentation of those by ruled lines. In the example of FIG. 4, it can be considered that the document 400 represents a single chapter including a title, namely, a title 410, and the chapter includes three sections indicated by section titles 420, 430, and 440.

In the section corresponding to the section title 420, a numbered list 422 is arranged below a section body 421. In a similar manner, in the section corresponding to the section title 430, a numbered list 432 is arranged below a section body 431. In the section corresponding to the section title 440, a table caption 442 and a table 443 are arranged below a section body 441. That is, the document 400 indicates a hierarchical structure in which the chapters are followed by the sections and the sections are followed by the section bodies.

Figure 5:
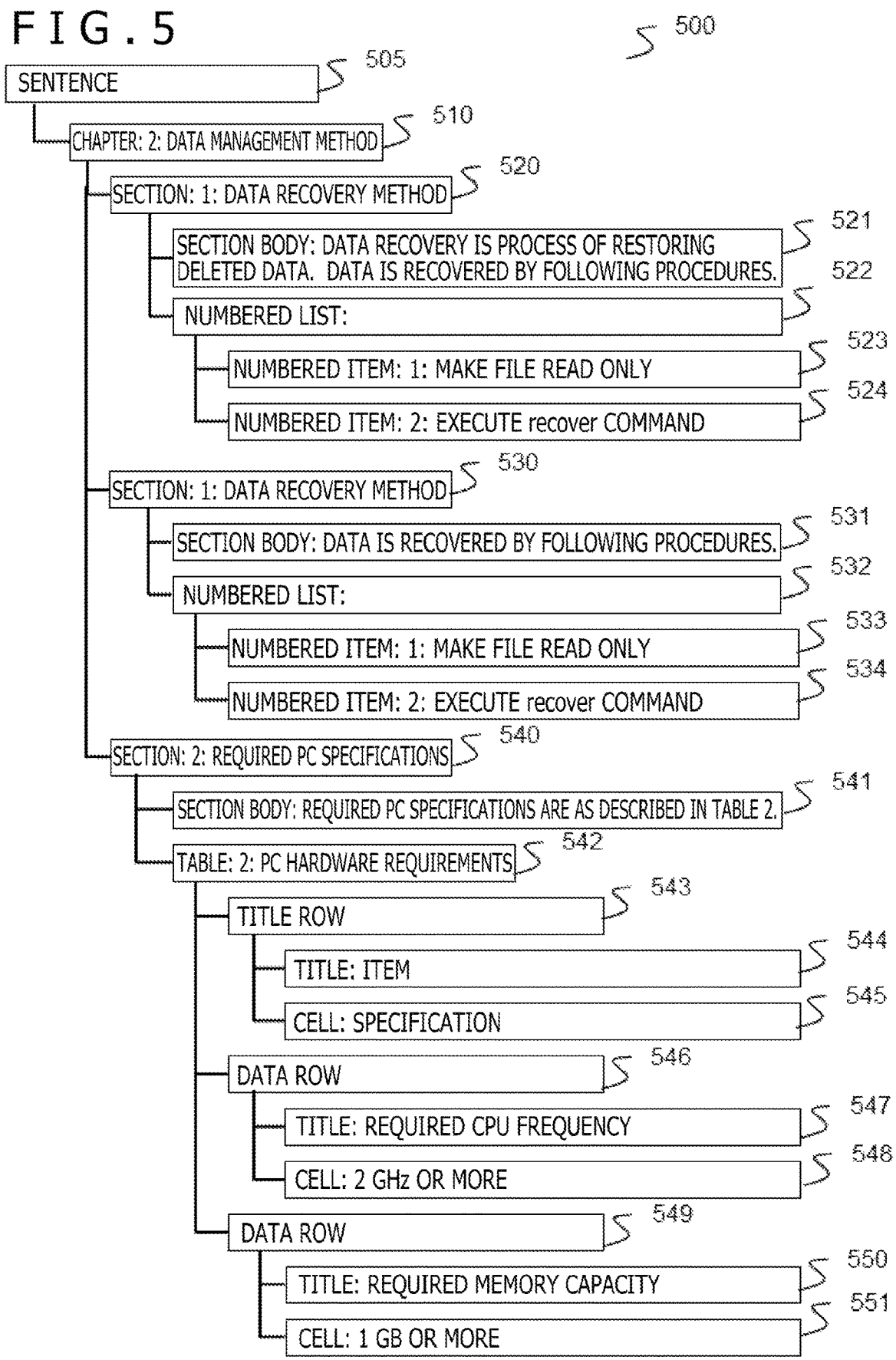
FIG. 5 is a diagram illustrating an exemplary hierarchical structure obtained by converting the document according to Embodiment 1.

FIG. 5 illustrates an example of structure information 500 in which the structure of the document 400 is analyzed to be expressed in the form of a tree structure.

The structure information 500 is expressed as a tree structure including a node group including a root node 505 as the root. In the structure information 500, a relation that is an inclusion relation in the document is expressed as a parent-child relation. For example, the root node 505 has a node 510 corresponding to a chapter as the child, and the node 510 corresponding to a chapter has nodes 520, 530, and 540 corresponding to a section. The nodes 520, 530, and 540 corresponding to a section have, as the children related to the contents of the sections, nodes 521, 531, and 541 corresponding to a section body, nodes 522 and 532 corresponding to a numbered list, a node 542 corresponding to a table, or the like. The nodes 522 and 532 corresponding to a numbered list have nodes 523 and 524 and nodes 533 and 534, respectively, each of which corresponds to the item of the numbered lists.

The node 542 corresponding to a table has nodes 543, 546, and 549 each corresponding to a row of the table, and the nodes 543, 546, and 549 corresponding to a row have nodes 544, 545, 547, 548, 550, and 551 each corresponding to a cell of the row. In the table, an expression method different in terms of structural information may be employed. For example, a node corresponding to a table may have nodes corresponding to a column of the table as the child nodes, and the nodes corresponding to a column may have nodes each corresponding to a cell of the column as the child nodes. Further, irrespective of the order of column and row, all the cells of the table may be listed as nodes corresponding to the table and regarded as the child nodes of the table.

Each node can hold, with respect to the portion in the document that corresponds to the node, not only the hierarchical name (chapter, section, table, or the like), but also information based on the text included in the portion and the structure (the page, chapter, section, table number, or position and font information on the text in the document).

In Embodiment 1, in the tree structure of the structure information 500, a description that matches a pattern defined in advance, that is, a subtree of the tree structure, is extracted to generate an answer sentence. The pattern of the subtree of the tree structure is stored in the pattern database 261.

FIG. 6 illustrates a pattern example 600.

The pattern example 600 includes three patterns 610, 611, and 612. The patterns 610, 611, and 612 each include an extraction pattern 620 corresponding to a part of the tree structure of the structure information and an answer data template 630 from which a question-answer pair is generated when a description matching the pattern is extracted.

An extraction pattern description 621 indicates an example of the extraction pattern 620. In this pattern, the hierarchical names and text of nodes in a parent-child relation in the tree structure are described as a pair to indicate a structure to be extracted. In this example, a case where a hierarchical name 622 "section" and a hierarchical name 624 "section body" are in a parent-child relation is illustrated. Further, a slot 623 "<phrase>" and a slot 625 "<meaning>" are described in association with the respective hierarchical names. This indicates that, in extracted structures, the text of the corresponding nodes is assigned to those slots.

An extraction pattern description 641 indicates another example of the extraction pattern 620. The extraction pattern description 641 indicates a pattern matching a structure in a table form, by using a plurality of hierarchical names 642, 643, and 645.

An extraction pattern description 661 indicates still another example of the extraction pattern 620. In the extraction pattern description 661, a plurality of hierarchical names are not defined, and a sentence pattern 664 having slots 662 and 663 is described. This means that the extraction pattern description 661 matches any node irrespective of the hierarchical name in the hierarchical structure. Meanwhile, only a node having a sentence matching the sentence pattern 664 is acceptable.

As the method for describing the extraction pattern 620, other than the method illustrated in FIG. 6, a technology that flexibly takes the correspondence relation between tree structures can be employed. For example, Taxonomy of XML schema languages using formal language theory. ACM Trans. Internet Technol. 5, 4 (November 2005), 660-704. proposes a method that flexibly extracts a subtree matching a pattern from a document having a tree structure described in Extensible Markup Language (XML).

The answer data template 630 is described as a pair of question sentence and answer sentence. Those question sentence and answer sentence can include slots that appear in the extraction pattern 620. In this case, when an extracted subtree has text associated with a slot in the extraction pattern 620, an answer sentence is generated with the text assigned to the slot of the answer sentence.

Although not illustrated in FIG. 6, a description for making a change in slot output may be added to the answer data template 630. For example, a change to an appropriate conjugated form in Japanese, an appropriate change of verb tense or singular and plural noun form in English, and the like are conceivable.

Note that, although the document structure is expressed as the tree structure in FIG. 5 and FIG. 6, any other expression form capable of expressing substructures is also employed. For example, the table in the document may be expressed in a multidimensional array form or the like, instead of the tree structure.

Figure 7:
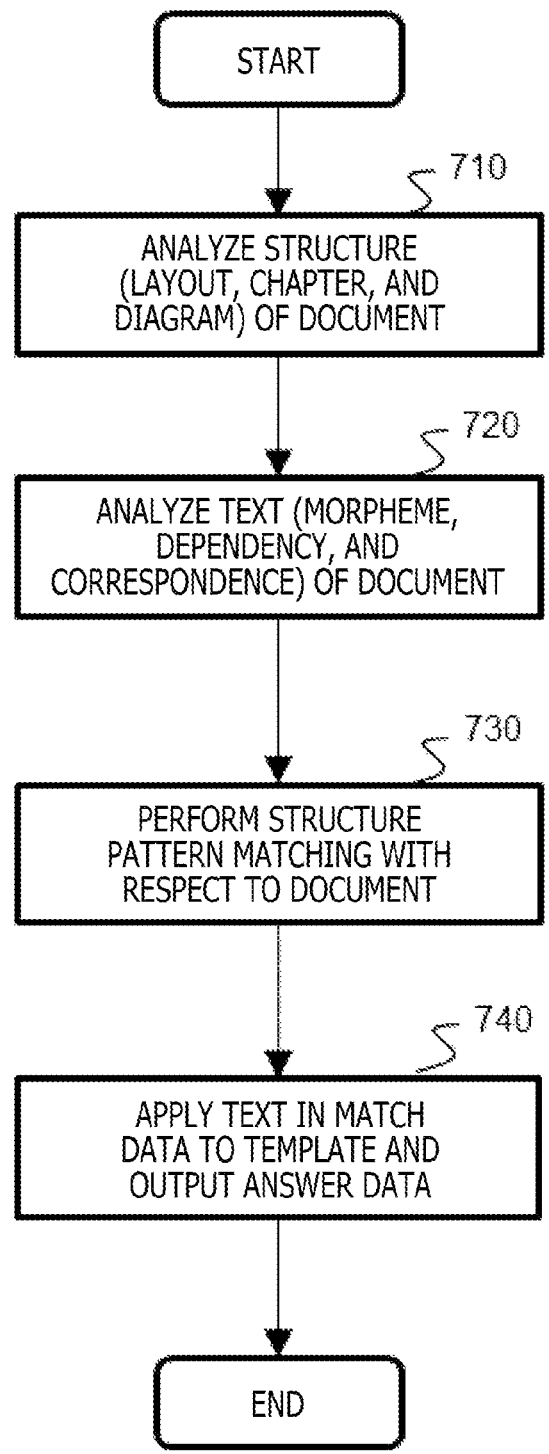
FIG. 7 is a flow chart of question-answer pair generation processing according to Embodiment 1.

FIG. 7 illustrates a question-answer pair data generation flow 700 with which the question-answer pair generation program 221 in the question answering computer 200 generates the question-answer pair data 112 from the document 120.

In Step 710, the structure analysis unit 240, and the layout analysis unit 241, the chapter hierarchy analysis unit 242, the table form analysis unit 243, the figure form analysis unit 244, and the like in the structure analysis unit 240 analyze the document 120 to convert the document 120 to an expression having a tree structure like the structure information 500. The document 120 can be converted by utilizing an existing technology. For example, as the technique for dividing a document file in a form without paragraph information by paragraph, which corresponds to the layout analysis unit 241, a technique that regards sentences close to each other as being in the same paragraph.

In Step 720, text information held by each node of the tree structure expression of the document 120, which has been obtained by the conversion in Step 710, is analyzed. Here, the morpheme analysis unit 251, the dependency analysis unit 252, the correspondence analysis unit 253, and the like included in the text analysis unit 250 each perform processing.

In Step 730, with regard to each pattern stored in the pattern database 261, a subtree matching the extraction pattern 620 is extracted from the tree structure expression of the document 400. In extracting a node group including nodes in a matching relation, the technique described in the treatise described above or the like can be used. Moreover, the text of each node of the extracted subtree and the text and slots in the extraction pattern 620 are checked against each other to determine whether there is a correspondence. When there is no correspondence, the subtree is regarded as being not to be extracted. In this checking processing, regular expressions or the like can be utilized.

In Step 740, the slots in the answer data template 630 for the subject subtree of the tree structure expression of the document 400 that is associated with the extraction pattern 620 in question are filled, and the answer data is output. At that time, from a single subtree, not a single piece of answer data but a plurality of pieces of data may be output on the basis of the answer data template 630. For example, answer data including words replaced by synonyms or rearranged by the synonym/paraphrase development unit 262 can also be output. Further, when answer data includes an expression referring to an item in the document 400, such as "table 2" or "page 30," the contents in the reference and a description indicating the reference, such as "following table" or "following description," may be added to the answer sentence.

FIG. 8 illustrates an example of answer data 800 generated from the document 400 and the structure information 500 corresponding thereto by performing the answer data generation flow 700 using the pattern example 600.

Entries 831, 832, and 833 of the answer data are exemplary entries generated when the nodes 520, 530, and 540 corresponding to a section and the child nodes thereof are associated with the pattern 621. In any entry, the content in the nodes 520, 530, and 540 corresponding to a section is incorporated in the question sentence, and the content in the child nodes is incorporated in the answer sentence. The answer sentence of the entry 833 includes a table. This is a result of the reference content addition processing in Step 740 with the description "table 2" in the node 541 that refers to the node 542 indicating the table 443 in the document 400.

Entries 834 and 835 of the answer data are exemplary entries generated when the nodes 546 and 549 corresponding to a data row in the table and the child nodes thereof are associated with the pattern 641. An entry 836 of the answer data is an exemplary entry generated when the first sentence of the node 521 corresponding to a section body is associated with the pattern 661.

An expected user 810 indicates an expected user of the document 400 from which question answering data is generated. This information is set on the basis of attributes of the document 400 (for example, when the document is a manual for maintenance personnel, the expected user is product vendor maintenance personnel) or the description in the document 400 (when the content is described in a chapter for a user administrator, the expected user is a user administrator).

As illustrated in FIG. 8, the question-answer pair data generation flow 700 can be applied to the document 400 to generate the answer data 800. Here, since the answer data 800 is mechanically generated from the document 400, an answer sentence that apparently suggests a dangerous operation can be included. For example, the entry 832 suggests the operation "delete volume." This is an operation that makes it impossible to utilize, if important data is contained in the volume, the data and is thus generally considered as a dangerous operation.

Figure 9:
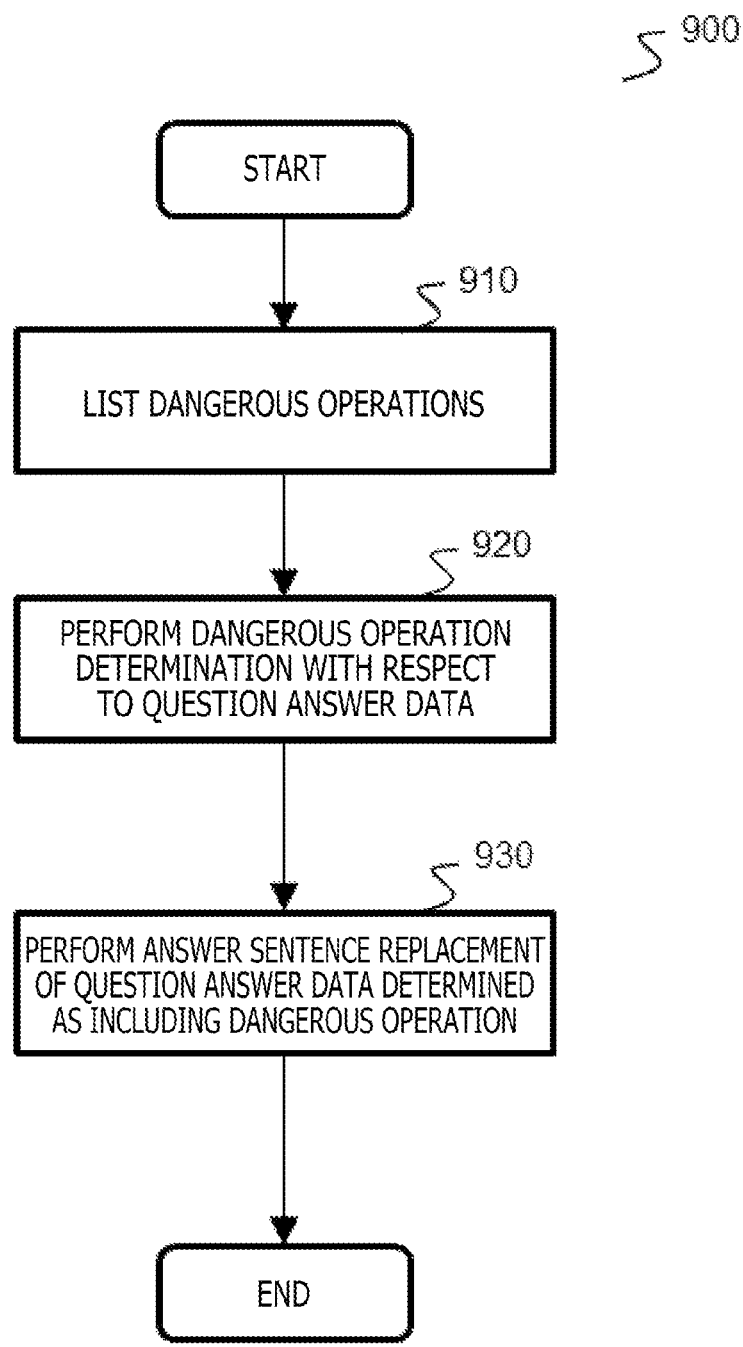
FIG. 9 is a flow chart of question-answer pair answer sentence replacement processing according to Embodiment 1.

FIG. 9 illustrates an answer sentence replacement processing flow 900 for replacing such a dangerous operation answer in the answer data 800.

The answer sentence replacement processing flow 900 is performed by the question-answer pair replacement program 222. The answer sentence replacement processing flow 900 may be executed in advance before the customer 140 asks a question or may be executed upon when the customer 140 asks a question. Each case has advantages and disadvantages. In the case where the answer sentence replacement processing flow 900 is executed in advance, there is a time for a person to check answer pair data obtained as a result of the replacement processing before the answer pair data is provided to the customer 140, so that the quality and contents of the answer sentence can be checked. Meanwhile, in the case where the answer sentence replacement processing flow 900 is executed upon when the customer 140 asks a question, the replacement method can be changed depending on the customer 140. However, in any case, since the question answering program 225 uses the result of the answer sentence replacement processing flow 900 as an answer for the customer, the answer sentence replacement processing flow 900 needs to be complete before the answer is provided to the customer.

In Step 910 of the answer sentence replacement processing flow 900, first, a dangerous operation database 226 in which dangerous operations are listed is created.

FIG. 10 illustrates a dangerous operation database example 1000.

The dangerous operation database example 1000 is expressed as including entries 1051, 1052, and 1053 each including a classification 1010, an expression 1020, and a replacement method 1030. The classification 1010 indicates the classification of a dangerous operation. The expression 1020 includes a list of the expressions belonging to the classification 1010. The expression 1020 may be described by a natural language or can include other expressions instructing operations, such as a command and an operation button name.

The replacement method 1030 describes, when the question-answer pair data 112 includes the expression 1020 classified as the classification 1010, how the answer sentence of the question-answer pair data 112 is to be replaced. For example, the entry 1051 means that the sentence is to be replaced by a message to a support department since the question-answer pair data 112 having the expression "delete data" corresponds to an answer sentence causing data lost. As in the entry 1053, it may be instructed not to employ the answer (that is, to provide answer data for another question instead). The dangerous operation database 226 may have individual entries created by manpower or entries created by extracting operations corresponding to a past problem and trouble list.

In Step 920 of the answer sentence replacement processing flow 900, it is determined whether each entry of the question-answer pair data 800 includes a dangerous operation. Specifically, when an entry is determined as including a description corresponding to the expression 1020 by referring to the dangerous operation database 226, the entry is determined as including a dangerous operation corresponding to the classification 1010. In Step 930, depending on the determination result in Step 920, answer sentence replacement is performed in accordance with the dangerous operation database 226. When a single entry corresponds to a plurality of dangerous operation classifications, replacement dealing with the classifications may be performed, or the dangerous operation classifications may be ranked and replacement related to only the highest rank operation may be performed.

FIG. 11 illustrates a replaced question-answer pair data example 1100.

The replaced question-answer pair data example 1100 indicates the result of the replacement of the question-answer pair data example 800 based on the dangerous operation database example 1000. The replaced question-answer pair data example 1100 is the same as the question-answer pair data example 800 in including the question sentence 410. However, the replaced question-answer pair data example 1100 is different from the question-answer pair data example 800 in including a replaced answer sentence 1120 instead of the answer sentence 420 and in additionally including a dangerous operation 1110.

Entries 1131, 1132, 1133, 1134, 1135, and 1136 are obtained from the entries 831, 832, 833, 834, 835, and 836, respectively, as a result of the application of the answer sentence replacement processing flow 900. The entry 831 includes the answer sentence 420 with the description "make the file read only," and this description is an expression classified as "data operation" in the dangerous operation database example 1000. Thus, in the entry 1131, "data operation" is stored as the dangerous operation 1110, and "please be aware that the following operation makes a change to the data" is added to the answer sentence 1120 on the basis of the instruction of the replacement method 1030 in the entry 1052.

In a similar manner, the entry 832 includes the answer sentence 420 with the description "delete volume," and this description is an expression classified as "data lost" in the dangerous operation database example 1000. Thus, in the entry 1132, "data lost" is stored as the dangerous operation 1110, and the sentence "please contact the support department" is described in the answer sentence 1120 by replacement based on the instruction of the replacement method 1030 in the entry 1051. The entries 833, 834, 835, and 836 have no description corresponding to the expression 1020 of the dangerous operation database example 1000, and hence, in the entries 1133, 1134, 1135, and 1136, N/A is described in the item of the dangerous operation 1110, and the replaced answer sentence 1120 is the same as the answer sentence 420.

With the answer sentence replacement processing flow 900, the replaced question-answer pair data 118 is generated from the question-answer pair data 112. After that, the question answering program 225 can perform question answering with the customer 140, using the replaced question-answer pair data 118. With this, the question answering program 225 can avoid an answer suggesting a dangerous operation such as "delete volume." Further, the question answering program 225 may use, when selecting an answer, the contents of the dangerous operation 1110 of the replaced question-answer pair data 118. For example, it may be determined that the entry 1132, which includes "data lost" in the dangerous operation 1110, is not to be selected as an answer candidate in the first place.

According to Embodiment 1, question-answer pair data that the question answering system uses can be generated using an existing document. Further, when an answer sentence includes an expression suggesting a dangerous operation, the answer sentence can be replaced or a warning message can be added, to thereby prevent an answer suggesting such an operation from being provided to the customer who is the questioner. With both of the advantages, the safe question answering system capable of answering more questions and configured not to answer dangerous operations can be achieved.

Embodiment 2

When there are a large number of documents 120, a wide variety of expressions are used in the documents. In such a case, the time and effort for creating the comprehensive dangerous operation database 226 is increased depending on the quantity of documents. In Embodiment 2, a method for supporting the creation of the dangerous operation database 226 is described.

A dangerous operation can be represented by the combination of operation object and operation content in many cases. Accordingly, operation objects and contents can be considered separately to facilitate determination on whether various operations are dangerous.

FIG. 12 illustrates an example of a dangerous operation determination table 1200.

The dangerous operation determination table 1200 is a biaxial table in which the classification 1010 of a dangerous operation of an expression representing an operation is obtained from operation content 1210 and an operation object 1220. In the dangerous operation determination table 1200, as the classification of operation content, row entries 1211, 1212, 1213, 1214, and 1215 are defined. A classification 1230 of operation content indicates the classification to which each entry belongs. An example 1231 indicates exemplary expressions belonging to each classification. A verb or noun indicating operation content generally corresponds to this.

For example, the row entry 1211 indicates that the expressions "erase," "delete," and "remove" are collectively classified as "delete." In a similar manner, as the classification of an operation object, column entries 1221, 1222, and 1223 are defined. A classification 1240 of an operation object indicates the classification to which each column entry belongs. An example 1241 indicates exemplary expressions belonging to each classification. A noun indicating an operation object generally corresponds to this. For example, the entry 1221 indicates that the expressions "volume," "disk," and "file" are collectively classified as "data."

When there is an expression including certain operation content and operation object, the corresponding row entry can be obtained from the operation content and the corresponding column entry can be obtained from the operation object with the use of the dangerous operation determination table 1200 to refer to a cell 1250 at which the entries cross each other, thereby defining the dangerous operation classification 1010 in the row. The entry 1051 is described as an example. Of the expression "delete volume," "delete" corresponds to the row entry 1211 and "volume" corresponds to the column entry 1221, and hence, it is found by referring to a cell 1251 at which the entries cross each other that the expression is classified as "data lost."

According to Embodiment 2, when the dangerous operation database 226 is created with documents including a ton of expressions, operation content and operation objects are individually classified, and a dangerous operation classification table based on the classification combinations is created in advance, to thereby facilitate the classification of a ton of dangerous operations.

Embodiment 3

In the embodiments described above, in the answer sentence replacement processing flow 900, it is determined whether a question-answer pair includes a dangerous operation from the sentence of the question-answer pair data 800.

As another technique for determining whether a dangerous operation is included, determining whether an expected user of the document 120, from which question-answer pairs are generated, and the customer 140 match each other can be used. For example, as an expected user of a document of a certain product, an end user, an administrator user, product vendor maintenance personnel, or the like is conceivable. It is generally considered that an administrator user has a greater operating authority than an end user, and product vendor maintenance personnel has a greater operating authority than an administrator user. For example, in the case of a storage device, the following authority levels are considered, for example: the end user does not have the authority to turn off the power but the administrator user has the authority, and neither the end user nor the administrator user can refer to the operation log information, but the product vendor maintenance personnel can refer to the operation log information. In such a case, contents of a document whose expected user is product vendor maintenance personnel are not to be executed by an end user and an administrator user. That is, a document whose expected user is product vendor maintenance personnel and a question-answer pair generated from the document are not to be unconditionally provided as an answer to the customer who is not product vendor maintenance personnel.

Accordingly, dangerous operation determination using information on an expected user of a document is made. In making this determination, in the question-answer pair data 800 created by the question-answer pair data generation flow 700, an expected user of the document 120, from which question-answer pairs are generated, is also described as the expected user 810 for each question-answer pair entry.

FIG. 14 illustrates a dangerous operation database example 1400 according to Embodiment 3.

The dangerous operation database example 1400 is expressed as including entries 1451 and 1452 each including the classification 1010, a condition 1420, and the replacement method 1030. The classification 1010 and the replacement method 1030 are the same as those in the dangerous operation database example 1000 according to Embodiment 1. The condition 1420 includes an expected user 1421 of a document and a user attribute 1422. Those indicate that, when an expected user of a question-answer pair and the attribute of the customer 140, who is the user of the question answering system, match an entry, the question-answer pair is classified as the classification 1010 and subjected to replacement based on the replacement method 1030.

Figure 15:
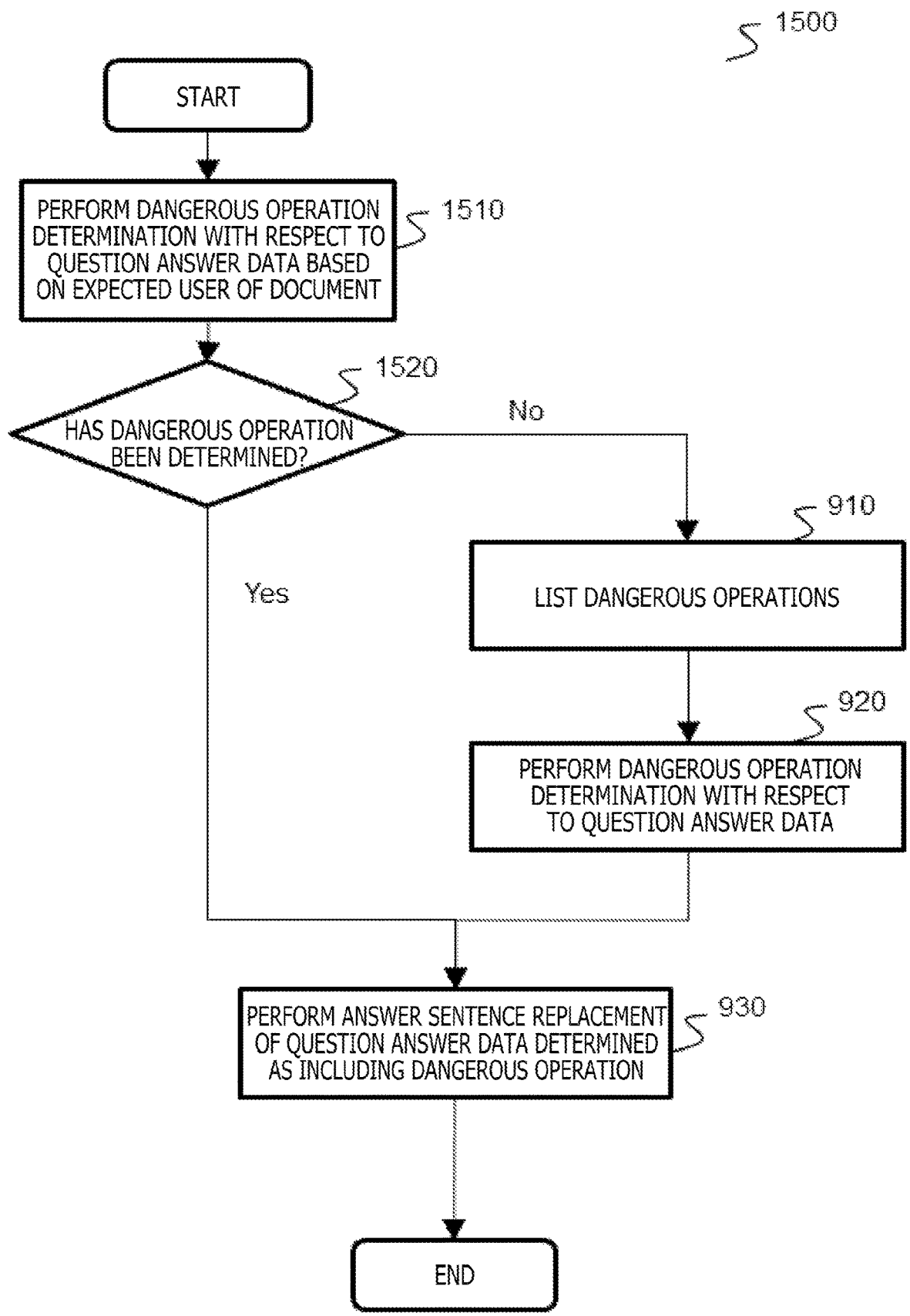
FIG. 15 is a flow chart of answer sentence replacement processing according to Embodiment 3.

FIG. 15 illustrates an answer sentence replacement processing flow 1500 according to Embodiment 3.

The answer sentence replacement processing flow 1500 may be executed in advance before the customer 140 asks a question or may be executed upon when the customer 140 asks a question. In Step 1510 of the answer sentence replacement processing flow 1500, each entry of the question-answer pair data example 800 is checked against the dangerous operation database example 1400 together with the expected user 810 and the attribute of the customer 140, to thereby determine whether a dangerous operation is included or not. When there is an entry matching the condition 1420 in the dangerous operation database example 1400, the entry in the question-answer pair data example 800 is determined as including a dangerous operation described in the classification 1010. In Step 1520, when it has been determined in Step 1510 that the entry of the question-answer pair data example 800 includes a dangerous operation, the processing proceeds to Step 930. When it has been determined that no entry includes a dangerous operation, the processing proceeds to Step 910. In Steps 910, 920, and 930, processing equivalent to that in the answer sentence replacement processing flow 900 according to Embodiment 1 is performed.

According to Embodiment 3, the dangerous operation determination and answer sentence replacement of a question-answer pair are performed using information on an expected user of a document, so that an answer suggesting an operation not to be performed by the customer 140 can be positively replaced.

Embodiment 4

In the embodiments described above, a dangerous operation is determined from the description contents of a document and an intended user.

As another dangerous operation determination method, there is a method that makes, when a questioner asks a question about his/her own device, determination on the basis of information on the device that the questioner owns.

FIG. 13 illustrates an example of device information 1300.

The device information 1300 includes, as the items, an owner 1310, a device identifier (ID) 1311, a component/index 1312, and a condition 1313. Further, the device information 1300 includes a plurality of entries 1320 to 1329. Each entry describes the condition of a single component/index of a certain single device. The owner 1310 indicates a customer who owns the device. The device ID 1311 indicates a unique character string identifying the device. The component/index 1312 and the condition 1313 indicate a component of the device or an index related to the device and the condition of the device. The component may be something with shape or something with no shape such as software component. In the case of the index, an item evaluable as a performance value, an operating time value, or the like is described. The condition may be expressed by a binary of normal and abnormal or by a quantitative value as in the entries 1323 and 1327.

Figure 16:
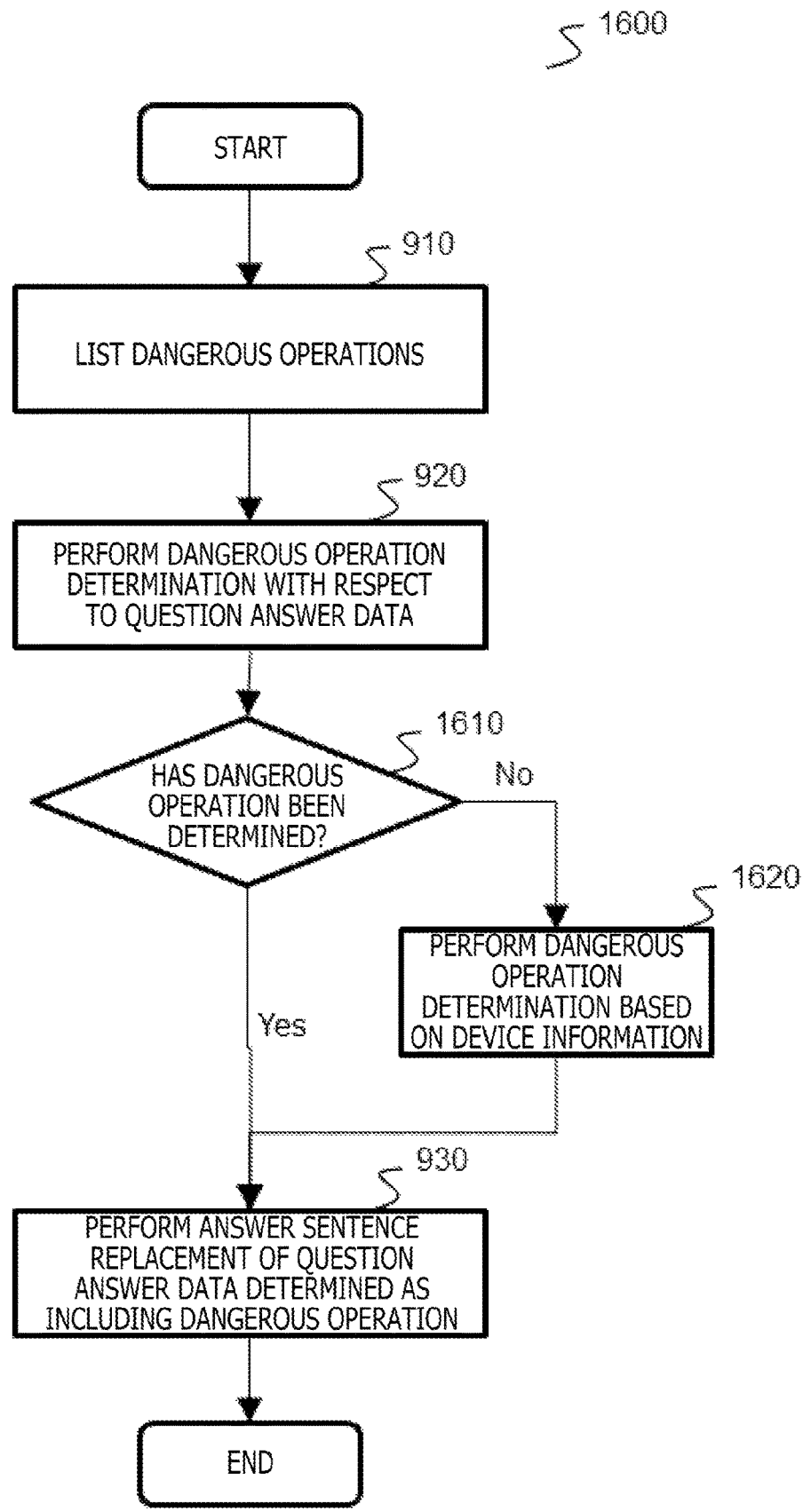
FIG. 16 is a flow chart of answer sentence replacement processing according to Embodiment 4.

FIG. 16 illustrates an answer sentence replacement processing flow 1600 according to Embodiment 4.

In the answer sentence replacement processing flow 1600, after Step 920 of the answer sentence replacement processing flow 900, Step 1610 is performed. In Step 1610, when it has been determined in Step 920 that the entry of the question-answer pair data example 800 includes a dangerous operation, the processing proceeds to Step 930. When it has been determined that no entry of the question-answer pair data example 800 includes a dangerous operation, the processing proceeds to Step 1620. In Step 1620, it is determined whether the entry of the question answering data 800 includes a dangerous operation, using the device information 1300.

It is assumed that the user attribute of a customer with whom question answering is performed has been successfully identified from the questions asked so far or the like. Further, the device about which the questions have been asked may have been successfully identified. In such a case, the dangerous operation determination program 223 checks the user attribute and the device about which the questions have been asked (if having been identified) against the owner 1310 and the device ID 1311 of the device information 1300, to thereby extract an entry matching the question in terms of owner and device. For example, when the questioner is "Alice" and the device is "ABC123," an entry 1320, 1321, 1322, or 1323 is extracted.

At this time, two procedures are conceivable for the answer sentence. In the first one, the entries of the question answering data 800 that are related to other devices but are not related to the device "ABC123" are first determined as including a dangerous operation. This prevents the operations related to the devices other than "ABC123" from being provided as answers without change.

In the other one, an operation related to a normal component/index is prevented from being provided as an answer without change. When the answer sentence 420 of the question answering data 800 includes an operation affecting the component/index 1312 and the condition 1313 corresponding to the component/index 1312 indicates normal or a quantitative value that can be regarded as normal, the answer sentence 420 can be determined as a dangerous answer suggesting the operation on the normal component/index. Alternatively, when the result of an operation is predictable and it can be predicted that the condition 1313 changes to abnormal with the operation, the answer sentence 420 can be determined as a dangerous answer (for example, it is predictable that an operation for turning off the power makes the power enter an abnormal condition). After the dangerous operation determination in Step 1620, the processing proceeds to Step 930 where sentence replacement is performed.

According to Embodiment 4, the question answering system can be prevented from suggesting, as an answer for the inquiry from a questioner, an operation on a normally operating device and component/index. With this, the questioner can be prevented from performing, on the normally operating device and component/index, an operation that causes troubles.

Embodiment 5

In each embodiment described above, the technique that determines a dangerous operation by the time at which the question answering system provides an answer.

In Embodiment 5, there is described a method that utilizes question answering data in the question answering system once and then performs dangerous operation determination and sentence replacement depending on the feedback from the customer 140.

In Embodiment 5, the question answering program 225 answers the inquiry from the customer 140, by using the question-answer pair data 112 before sentence replacement or the replaced question-answer pair data 118.

When the customer 140 who has received the answer determines that the answer includes a dangerous operation and notifies the question answering system of the determination result, in the replaced question-answer pair data 118, the dangerous operation 1110 of the corresponding question answering entry is updated depending on the notification, and sentence replacement similar to that in Step 930 is performed on the replaced answer sentence 1120.

A plurality of methods are conceivable as the method for updating the dangerous operation 1110 on the basis of the notification received from the customer 140. In one of the methods, the customer 140 directly contacts a support 130 to tell him/her that the answer sentence includes a dangerous operation. In such a case, the support 130 performs an operation to update the dangerous operation 1110. In another method, the question answering system asks the customer 140 for feedback about the answer in the text or selective form and updates the dangerous operation 1110 depending on the feedback result. As still another method, a method that uses the device information 234 is conceivable. When the device information 234 has been updated by the customer 140 performing an operation based on the result of question answering and the occurrence of a trouble in a specific portion has been recognized by the question answering system, it can be determined that the answer sentence has included a dangerous operation.

According to Embodiment 5, the question answering system can perform, with the feedback from a questioner or his/her own device in question answering, the identification and sentence replacement of an answer sentence including a dangerous operation. With this, answers including dangerous operations can be prevented from being provided to the questioner in question answering thereafter.

The question answering system of one of the embodiments described above determines whether each expected question-answer sentence pair is an expected question-answer sentence pair suggesting a dangerous operation. When it is determined that an expected question-answer sentence pair suggests a dangerous operation, the question answering system replaces the answer sentence by a safe sentence and provides the resultant as an answer instead of using the answer sentence as it is.

According to the embodiments described above, the question answering system is prevented from suggesting dangerous operations to a questioner. As a result, the questioner is prevented from performing a wrong operation on the basis of the answer.

What is claimed is:

1. A question answering system that prevent the question answering system from suggesting a dangerous operation to a questioner, the question answering system comprising:
   a memory; and
   a central processing unit (CPU) that is communicatively coupled to the memory, wherein the CPU is configured to:
   receive a question from the questioner,
   identify, based on the question, a question pattern and an answer pattern corresponding to the question pattern from a description included in a document and convert the question pattern and answer pattern identified to create question-answer pair data including a question sentence and an answer sentence; and
   replace the question-answer pair data by replaced question-answer pair data including the question sentence and a replaced answer sentence,
   wherein the replaced question-answer pair data is determined by determining whether the answer sentence of the question-answer pair data includes the dangerous operation, and
   replacing, when it is determined that the dangerous operation is included in the answer sentence, the answer sentence including a description of the dangerous operation by the replaced answer sentence depending on a classification of the dangerous operation, to thereby create the replaced question-answer pair data.

2. The question answering system according to claim 1, wherein the CPU is further configured to:
   determine whether the answer sentence included in the question-answer pair data includes an answer including the description of the dangerous operation, and
   replace, when it is determined that the answer sentence includes the answer including the description of the dangerous operation, the answer sentence by the replaced answer sentence depending on the classification of the dangerous operation.

3. The question answering system according to claim 2, wherein the CPU is further configured to:
   add, when it is determined that the answer sentence includes the answer including the description of the dangerous operation, a predetermined warning message depending on the classification of the dangerous operation to the answer sentence.

4. The question answering system according to claim 2, wherein the CPU is further configured to:
   replace, when it is determined that the answer sentence includes the answer including the description of the dangerous operation, a sentence of the answer sentence by another sentence different from the answer sentence depending on the classification of the dangerous operation.

5. The question answering system according to claim 2, wherein the CPU is further configured to:
   create in advance a dangerous operation database including the classification of the dangerous operation, an expression belonging to the classification of the dangerous operation, and a method for replacing the answer sentence, and
   refer to, when it is determined that the answer sentence includes the answer including the description of the dangerous operation, the dangerous operation database and replaces the answer sentence by the replaced answer sentence depending on the classification of the dangerous operation.

6. The question answering system according to claim 5, wherein the CPU is further configured to:
   refer to the dangerous operation database and determines, when the answer sentence has the expression belonging to the classification of the dangerous operation, that the answer sentence includes the answer including the description of the dangerous operation.

7. The question answering system according to claim 5, wherein the CPU is further configured to:
   obtain the classification of the dangerous operation from operation content and an operation object, to thereby create the dangerous operation database.

8. The question answering system according to claim 1, wherein the CPU is further configured to:
   create the question-answer pair data further including an expected user of the document,
   determine, when determining whether the question-answer pair data includes the dangerous operation, whether the dangerous operation is included or the answer sentence includes the description of the dangerous operation on a basis of a relation between the expected user and the questioner,
   replace, when it is determined that the dangerous operation is included on the basis of the relation between the expected user and the questioner, the answer sentence by the replaced answer sentence depending on the classification of the dangerous operation, and
   replace, when it is determined that the answer sentence includes the description of the dangerous operation, the answer sentence including the description of the dangerous operation by the replaced answer sentence depending on the classification of the dangerous operation.

9. The question answering system according to claim 8, wherein the CPU is further configured to:
determine, when the expected user is different from the user, that the dangerous operation is included.

10. The question answering system according to claim 1, wherein the CPU is further configured to:
determine, when determining whether the question-answer pair data includes the dangerous operation, whether the dangerous operation is included or the answer sentence includes the description of the dangerous operation on a basis of device information on a device that a user owns,
replace, when it is determined that the dangerous operation is included on the basis of the device information, the answer sentence by the replaced answer sentence depending on the classification of the dangerous operation, and
replace, when it is determined that the answer sentence includes the description of the dangerous operation, the answer sentence including the description of the dangerous operation by the replaced answer sentence depending on the classification of the dangerous operation.

11. The question answering system according to claim 10, wherein the CPU is further configured to:
determine whether the dangerous operation is included depending on whether a condition indicates normal or abnormal.

12. The question answering system according to claim 1, wherein the CPU is further configured to:
replace based on feedback information from the questioner, the answer sentence by the replaced answer sentence depending on the classification of the dangerous operation.

13. A non-transitory computer readable medium storing instructions for preventing a question answering system from suggesting a dangerous operation to a questioner, the instructions when executed by a central processing unit of the question answering system cause the question answering system to execute a method comprising:
receiving a question from the questioner;
identifying, based on the question, a question pattern and an answer pattern corresponding to the question pattern from a description included in a document and converting the question pattern and answer pattern identified to create question-answer pair data including a question sentence and an answer sentence; and
replacing the question-answer pair data by replaced question-answer pair data including the question sentence and a replaced answer sentence,
wherein the replaced question-answer pair data is determined by determining whether the answer sentence of the question-answer pair data includes the dangerous operation, and
replacing, when it is determined that the dangerous operation is included in the answer sentence, the answer sentence including a description of the dangerous operation by the replaced answer sentence depending on a classification of the dangerous operation, to thereby create the replaced question-answer pair data.

14. A question answering method for preventing a question answering system from suggesting a dangerous operation to a questioner, the question answering method comprising:
receiving a question from the questioner;
identifying, based on the question, a question pattern and an answer pattern corresponding to the question pattern from a description included in a document and converting the question pattern and answer pattern identified to create question-answer pair data including a question sentence and an answer sentence; and
replacing the question-answer pair data by replaced question-answer pair data including the question sentence and a replaced answer sentence,
wherein the replaced question-answer pair data is determined by:
determining whether the answer sentence of the question-answer pair data includes the dangerous operation, and
replacing, when it is determined that the dangerous operation is included in the answer sentence, the answer sentence including a description of the dangerous operation by the replaced answer sentence depending on a classification of the dangerous operation, to thereby create the replaced question-answer pair data.

* * * * *